June 15, 1948. A. J. HIGGINS 2,443,505
LOCKING PLATE FOR CLUTCH LEVERS AND THE LIKE
Filed June 11, 1945
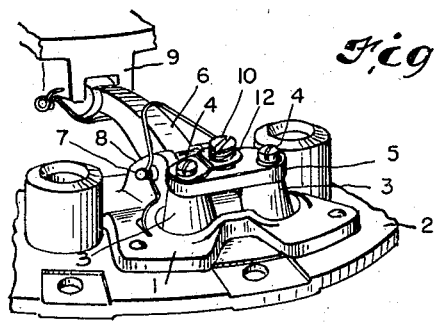
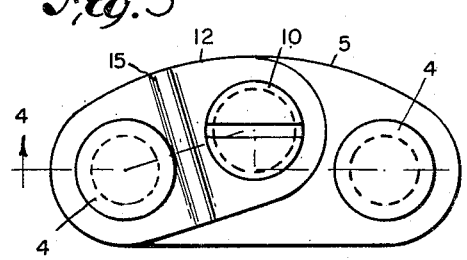
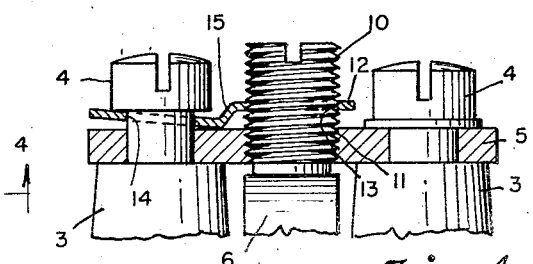
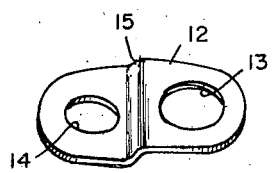
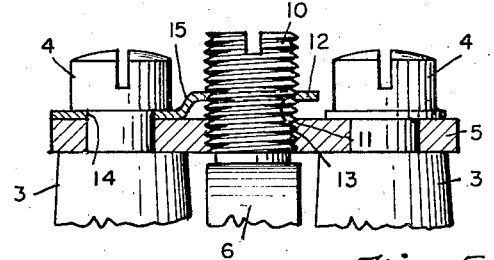
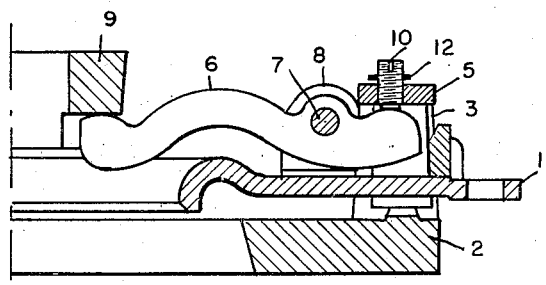
INVENTOR.
ALBERT J. HIGGINS
BY
Oberlin & Limbach
ATTORNEYS Patented June 15, 1948

2,443,505

UNITED STATES PATENT OFFICE 2,443,505

LOCKING PLATE FOR CLUTCH LEVERS AND THE LIKE

Albert J. Higgins, Cleveland, Ohio, assignor to Ira Saks, Cleveland, Ohio

Application June 11, 1945, Serial No. 598,817

1 Claim. (Cl. 192—109)

The present invention, relating as indicated to locking plates for clutch levers, has more particular regard to improved means for retaining in adjustable locked position the bearing elements on the cover plate of the conventional type of clutch currently in use in automotive vehicles, or more generally in association with internal combustion engines.

The adjustability of the pivotal positions of clutch operating levers is of particular importance in preserving the useful life and efficient operation of an automotive clutch. After a period of use and wear the clutch levers and associated parts become either worn or bent so that they do not remain in proper alignment, particularly with the throw-out collar, such alignment being highly important in order that such collar may simultaneously contact with the levers and exert uniform pressure thereon. Accordingly, one principal object of the present invention is to provide means for adjusting the bearing points wherewith the ends of such clutch levers contact so that their action may be uniform despite wear and tear in use. A further object is to provide an adjustment whereby contact may be made either above or below the normal plane of contact in clutches as heretofore made, so that uniformity in the action of such lever may be more readily secured in the clutch as initially assembled.

To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:

Fig. 1 is a perspective view showing a clutch lever bearing plate embodying my present improvements in assembly with related parts of a conventional clutch;

Fig. 2 is a sectional view of such assembly taken on a radial vertical plane;

Fig. 3 is a top plan view of the clutch lever plate;

Fig. 4 is a vertical section through such plate and supporting parts, the plane of the section being indicated by the line 4—4 Fig. 3, certain parts being in a preliminary stage of adjustment;

Fig. 5 is a view similar to Fig. 4 but showing the parts as finally set for use in operation of the clutch; and Fig. 6 is a perspective view of the locking element proper.

Referring to the assembly views shown in Figs. 1 and 2, these will be found to illustrate the cover plate 1 and pressure plate 2 of a typical clutch of the type employed in automotive vehicles. Pairs of pressure plate posts 3 extend from the plate 2 through the cover 1, and secured to the outer ends of such pairs of posts, by means of threaded studs or cap screws 4, is a clutch lever bearing plate 5. The clutch lever 6 (there usually being three such levers and corresponding parts in a clutch of the type in question), is pivotally mounted upon a pin 7 that is carried by lugs 8 between which such lever is thus oscillatorily held. The inner end of the lever 6 bears against the usual throw-out collar 9 and in the clutch as ordinarily constructed the outer end of said lever engages directly with the bearing plate 5.

In the present construction, in order to provide for adjustment of such last-mentioned point of contact between the outer end of the lever with the bearing plate, a stud 10 is threadedly engaged in an aperture 11 in such plate mid-way between paired posts 3 to which the latter is secured. By rotating such stud in one direction or the other its inner end which forms the point of contact with the lever end may be moved in or out as desired.

It is important that when such point of contact has been properly adjusted, such adjustment should be maintained, and to this end I provide a novel form of locking device in association with stud 10. Such device, as best shown in Fig. 6, comprises an oblong washer 12, preferably stamped out of sheet metal and formed with an aperture 13 adjacent one end which is adapted to fit the threaded stud 10, and a second aperture 14 adjacent its other end which is adapted to engage one of the studs 4 whereby the plate 5 is secured to the posts 3. The portions of the washer in which such apertures are respectively formed are offset with respect to each other so as to lie in different planes, and in the normal condition of the washer, as shown in Fig. 4, such planes are not parallel, but slightly divergent. However, as shown in Fig. 5, when the portion of the washer that is engaged by stud 4 is pressed down, the intermediate connecting portion 15 of the washer will be bent until such apertured portions are forced into parallel relation.

The result of the action just described will be securely to lock the threaded stud 10 in its adjusted position. However, by loosening stud 4 until the washer is permitted to assume its normal form, as shown in Fig. 4, such threaded stud 10 may be freely rotated to adjust the position of its inner end which forms the point of contact for lever 6.

The locking device thus provided, while simple and inexpensive to manufacture, has been found in actual use to be most effective in retaining the bearing element provided by set screw 10 in bearing plate 5 in selected adjusted position. Furthermore, the device is extremely easy to operate, all that is necessary after the set screw 10 has been adjusted being to retain the latter against rotation as by means of a screwdriver, while the cap screw 4 is tightened by means of another screwdriver, or if such screw is provided with a polygonal head, then by means of a wrench. It will be understood that in place of employing cap screws to secure bearing plate 5 on the paired posts 3, the latter may be provided with threaded studs and nuts then used to hold down such plate. Obviously in such case the nut on such threaded stud will cooperate in the same manner as the head of the cap screw with the washer 12. The term "cap screw" as used herein will accordingly be understood to connote equally a nut thus mounted on a threaded stud.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

In a clutch of the type described having an oscillatory lever for engaging and disengaging a pressure plate, the combination of a bearing plate mounted adjacent the actuating end of said lever, a pair of cap screws holding said bearing plate in place, a screw threadedly mounted in said bearing plate and presenting a surface opposed to said lever near said actuating end, and a locking washer for said last mentioned screw comprising an apertured portion threadedly engaging said screw and a second closely fitted apertured portion, offset and normally lying at an angle to said first portion, one of said cap screws passing through said second aperture in said offset portion with the head of said screw engaging the latter.

ALBERT J. HIGGINS.

REFERENCES CITED

The following references are of record in the file of this patent:

UNITED STATES PATENTS

| Number | Name | Date |
|---|---|---|
| 826,584 | Lehman | July 24, 1906 |
| 1,236,652 | Asprooth | Aug. 14, 1917 |
| 1,267,656 | Goserud | May 28, 1918 |
| 1,516,699 | Belden | Nov. 25, 1924 |
| 1,583,015 | Seeger | May 4, 1926 |
| 1,684,619 | Endsley | Sept. 18, 1928 |
| 1,757,137 | Palmer | May 6, 1930 |
| 1,886,294 | Morris | Nov. 1, 1932 |
| 2,074,084 | Ellestad | Mar. 16, 1937 |